United States Patent
Inkala et al.

(10) Patent No.: US 11,928,636 B1
(45) Date of Patent: Mar. 12, 2024

(54) WORKFORCE KNOWLEDGE RISK MITIGATION

(71) Applicant: Wells Fargo Bank, N.A., San Francisco, CA (US)

(72) Inventors: Paul Inkala, Apple Valley, MN (US); Ashif Lalani, Chandler, AZ (US); Kevin McNeff, Charlotte, NC (US); Tara Richards, Castle Rock, CO (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

(21) Appl. No.: 17/335,830

(22) Filed: Jun. 1, 2021

(51) Int. Cl.
*G06Q 10/0639* (2023.01)
*G06F 16/26* (2019.01)
*G06Q 10/0631* (2023.01)
*G06Q 10/0635* (2023.01)

(52) U.S. Cl.
CPC ....... *G06Q 10/06395* (2013.01); *G06F 16/26* (2019.01); *G06Q 10/063114* (2013.01); *G06Q 10/0635* (2013.01)

(58) Field of Classification Search
None
See application file for complete search history.

(56) References Cited

U.S. PATENT DOCUMENTS

| | | | | |
|---|---|---|---|---|
| 8,639,551 B1* | 1/2014 | Feng | .............. | G06Q 10/063118 705/7.17 |
| 9,645,817 B1* | 5/2017 | van Schaik | ............... | G06F 8/77 |
| 10,832,583 B2* | 11/2020 | Bouillet | .................... | G09B 5/12 |
| 10,878,381 B2* | 12/2020 | Rennison | ............. | G06Q 10/105 |
| 11,200,324 B1* | 12/2021 | Manral | ................. | G06F 21/629 |
| 2002/0138271 A1* | 9/2002 | Shaw | ...................... | G10L 17/26 704/E15.014 |
| 2008/0208543 A1* | 8/2008 | Harrison | ................. | G06F 30/13 703/1 |
| 2009/0182598 A1* | 7/2009 | An | ................. | G06Q 10/063112 705/7.14 |
| 2010/0233663 A1* | 9/2010 | Pennington | ............ | G09B 19/00 434/219 |
| 2012/0173732 A1* | 7/2012 | Sullivan | .................... | G06F 1/20 710/8 |
| 2014/0137074 A1* | 5/2014 | Hey | .......................... | G06F 8/70 717/101 |
| 2014/0188538 A1* | 7/2014 | Dasgupta | ....... | G06Q 10/063112 705/7.14 |

(Continued)

OTHER PUBLICATIONS

Jafari, Mostafa, et al. "Development and evaluation of a knowledge risk management model for project-based organizations: A multi-stage study." Management Decision 49.3 (2011): 309-329. (Year: 2011).*

(Continued)

*Primary Examiner* — Darlene Garcia-Guerra
(74) *Attorney, Agent, or Firm* — Merchant & Gould P.C.

(57) ABSTRACT

Systems and methods for identifying, categorizing, reporting, and/or remedying knowledge risks of a workforce. The systems and methods can operate automatically and in real-time. Risks can be identified on a per-skill basis using a plurality of risk factors. Graphical user interfaces can be generated to present knowledge risks across an entire enterprise or portion thereof in easily digestible formats. Upskilling recommendations can be generated based on categorization of knowledge risks.

4 Claims, 9 Drawing Sheets

(56) References Cited

U.S. PATENT DOCUMENTS

| | | | | |
|---|---|---|---|---|
| 2017/0017518 | A1* | 1/2017 | Wang | G06F 1/3203 |
| 2017/0124399 | A1* | 5/2017 | Bostick | G06V 10/7788 |
| 2018/0039562 | A1* | 2/2018 | Mochizuki | G06F 11/3624 |
| 2018/0268342 | A1* | 9/2018 | Duncan | G06Q 10/105 |
| 2019/0034060 | A1* | 1/2019 | Ahmad | G09B 5/12 |
| 2019/0066029 | A1* | 2/2019 | Hancock | G06N 5/04 |
| 2019/0068627 | A1* | 2/2019 | Thampy | H04L 63/1425 |
| 2019/0102741 | A1* | 4/2019 | Gupta | G06Q 10/0635 |
| 2020/0143702 | A1* | 5/2020 | Sood | G09B 5/00 |
| 2020/0159525 | A1* | 5/2020 | Bhalla | G06Q 10/06313 |
| 2020/0184589 | A1* | 6/2020 | Martinez Hernandez Magro | G06Q 50/2057 |
| 2020/0211135 | A1* | 7/2020 | De Cremer | G06Q 50/2057 |
| 2020/0387624 | A1* | 12/2020 | Dunjic | G06F 21/552 |
| 2021/0109497 | A1* | 4/2021 | Man | G06V 20/52 |
| 2021/0109512 | A1* | 4/2021 | Ganapathi | G05B 23/0264 |

OTHER PUBLICATIONS

Ras, Eric, et al. "Bridging the skills gap of workers in Industry 4.0 by human performance augmentation tools: Challenges and roadmap." Proceedings of the 10th International Conference on Pervasive Technologies Related to Assistive Environments. 2017 (Year: 2017).*

Oyetoyan, Tosin Daniel, Daniela Soares Cruzes, and Martin Gilje Jaatun. "An empirical study on the relationship between software security skills, usage and training needs in agile settings." 2016 11th International Conference on Availability, Reliability and Security (ARES). IEEE, 2016 (Year: 2016).*

McKenney, Martin J., and Holly A. Handley. "Using the DSRM to Develop a Skills Gaps Analysis Model." IEEE Engineering Management Review 48.4 (2020): 102-119 (Year: 2020).*

* cited by examiner

FIG. 8

| Skills | Application | Team (if applicable) | Frequency of Change | Complex | Critical Skill? | Team Member 1 | Team Member 2 | Team Member 3 | Team Member 4 | Team Member 5 | Rating > 79% Complete to Include? | @ Risk 40% Highly Skilled Frequent | @Risk Non Frequent | At Risk No Highly Skilled |
|---|---|---|---|---|---|---|---|---|---|---|---|---|---|---|
| Skill A | RPM | ACO | Rarely | High | Y | 1 | 1 | 4 | 4 | 1 | | | | |
| Skill B | RPM | ACO | Rarely | Low | Y | 2 | 4 | 2 | 4 | 3 | | | ■ | |
| Skill C | RPM | ACO | Frequent | High | Y | 3 | 4 | 2 | 2 | 3 | | ■ | | |
| Skill D | RPM | ACO | Rarely | High | Y | 3 | 3 | 3 | 3 | 3 | | | | ■ |
| Skill E | RPM | ACO | N/A | Low | Y | 4 | 4 | 4 | 4 | 2 | | | | |
| Skill F | RPM | ACO | Rarely | Low | Y | 3 | 4 | 4 | 4 | 3 | | | | |
| Skill G | RPM | ACO | Rarely | Low | Y | N/A | N/A | 4 | 4 | 3 | ■ | | | |

302 304 306 308 310 312 314 316 318 320 322 324 326 328 330

WORKFORCE KNOWLEDGE RISK MITIGATION

BACKGROUND

Business enterprises, such as financial institutions, can operate with expansive workforces. A workforce is typically divided into teams of individuals. Each team can be associated with a product or service, or a suite of products and/or services provided by the enterprise to, e.g., its customers or clients. In some cases, an association with a product or service includes an association with a computing infrastructure supporting the product or service.

For a given product or service, knowledge (e.g., level of expertise, frequency of engagement with the product or service, percentage of overall team knowledge with the product or service) is often distributed unevenly across members of the team. In addition, business enterprises commonly face turnover in workforces as team members leave the enterprise or move to another team, and new individuals join an enterprise or join a team from another team of the enterprise.

It is also common for the products, services, and/or underlying supporting infrastructure to be modified or updated periodically or at irregular intervals. These dynamic factors can represent a risk to the enterprise of its workforce dropping below a minimum acceptable level of knowledge with respect to a product or service.

SUMMARY

Embodiments of the present disclosure are directed to automate monitoring of knowledge distribution across a workforce or portion of a workforce of a business enterprise.

Embodiments of the present disclosure are directed to automate determining a knowledge level distribution risk across a workforce or portion of a workforce of a business enterprise.

Embodiments of the present disclosure are directed to automate categorizing a knowledge level distribution risk across a workforce or portion of a workforce of a business enterprise.

Embodiments of the present disclosure are directed to automate reporting of a knowledge level distribution risk across a workforce or portion of a workforce of a business enterprise in a highly structured and formatted manner to facilitated digestion of information provided in the report.

Embodiments of the present disclosure are directed to automate mitigating a knowledge level distribution risk across a workforce or portion of a workforce of a business enterprise.

Embodiments of the present disclosure are directed to automate distribution and/or initiation of an upskilling program to mitigate knowledge level distribution risk across a workforce or portion of a workforce of a business enterprise.

In one aspect, a computer implemented includes: determining, based on a factor, a knowledge risk associated with a workforce skill; categorizing, based on the factor, the knowledge risk in a risk category selected from a set of predefined knowledge risk categories; assigning a risk level to the knowledge risk based on the risk category; selecting, based on the risk category and the skill, an upskilling recommendation for reducing the knowledge risk; identifying, based on the recommendation, a digitally stored training media content item; and generating, using one or more graphical user interfaces: visual risk indicia that visually indicate the knowledge risk, the risk category, and the risk level; and a graphical element, the graphical element being selectable to play the training content item.

In another aspect, a computer-implemented method includes: identifying a team of individuals of a workforce associated with a skill; determining a knowledge level associated with the skill, the knowledge level corresponding to one of the individuals; determining, using the knowledge level, a knowledge level distribution associated with the skill for the individuals; determining a modification frequency for a scope of the skill, the scope defining a set of abilities required to perform the skill; quantifying a portion of knowledge of the team associated with the skill attributed to one of the individuals; receiving, using a graphical user interface, a workforce knowledge risk query for the skill; and generating, using another graphical user interface and in response to the query, a graphical representation of a knowledge risk associated with the workforce skill, the graphical representation being based on the knowledge level, the distribution, the frequency, and the quantified portion.

In another aspect, a system includes: one or more processors; and non-transitory computer-readable instructions that, when executed by the one or more processors, cause the system to: generate, using the graphical display, a first graphical user interface including a graphically represented dashboard having selectable buttons; receive a first selection, using the first graphical user interface, of one of the buttons; generate, in response to the first selection and using the graphical display, a second graphical user interface including a graphically represented workforce risk report having graphical elements indicating: a set of skills of a workforce; skills of the set that have an associated knowledge risk; skills of the set having an associated knowledge risk that have an implemented upskilling plan; and skills of the set that lack a subject matter expert from the workforce; receive a second selection, using the first graphical user interface, of another of the buttons; and generate, in response to the second selection and using the graphical display, a third graphical user interface including a graphically represented upskilling report indicating, for each skill having an implemented upskilling plan, a status of the upskilling plan.

The details of one or more techniques are set forth in the accompanying drawings and the description below. Other features, objects, and advantages of these techniques will be apparent from the description, drawings, and claims.

DESCRIPTION OF THE DRAWINGS

FIG. 8 is a portion of a further example graphical user interface generated by the system of FIG. 1.

DETAILED DESCRIPTION

Figure 1:
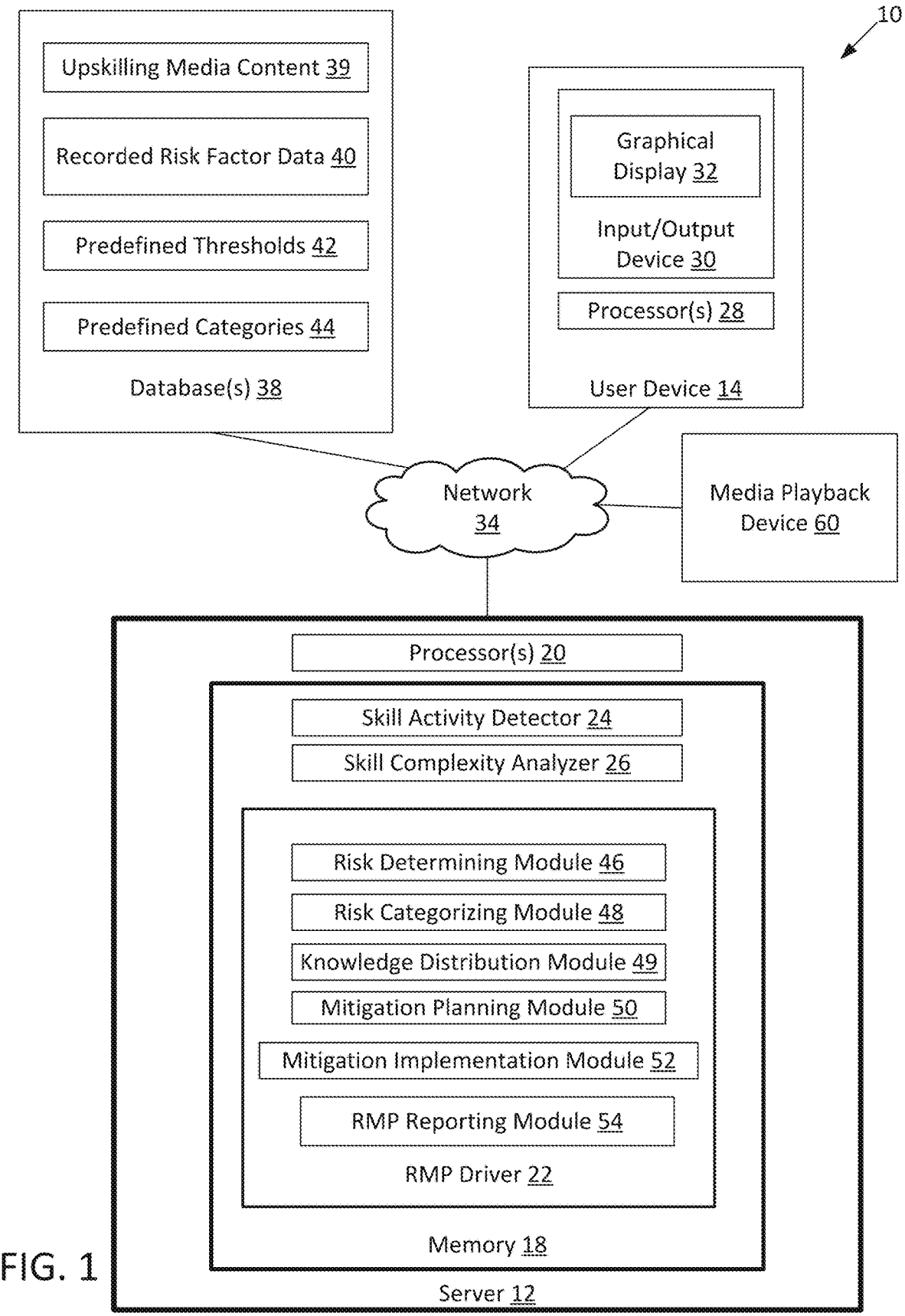
FIG. 1 schematically shows components of an example system directed to monitoring, identifying, and/or mitigating knowledge risk across a workforce.

The present disclosure is directed to monitoring, identifying, and mitigating knowledge risk across a workforce or a portion of a work force of a business enterprise.

An example of a business enterprise that will be referred to in this disclosure is a financial institution that provides banking, loan, investing, and other financial products and services to its customers. However, the principles of the present disclosure are not limited to financial institutions, and can be readily applied to any workforce of a business or organization.

A business enterprise typically has an expansive workforce of individuals, who collectively have knowledge of all the skills required for the enterprise to operate. A skill can be associated with a product or service of the enterprise, or a suite of products or services of the enterprise. In addition, a skill can be associated with any resource that directly or indirectly supports a product or service of the enterprise. Such resources can include computing resources (e.g., hardware, firmware, middleware, software), human resources (e.g., managing workforce changes), and physical plant resources, just to name a few.

Skill knowledge, or simply "knowledge", refers to familiarity with a skill. With respect to a given skill, each member of the workforce has a level of knowledge ranging from zero or none, to subject matter expert (SME). For a given skill, knowledge is distributed across the workforce. Typically, the knowledge of a given skill is concentrated in one or more teams of individuals from among the workforce whose responsibilities for the enterprise involve use of the skill at a substantial level. However, even within such a team, knowledge associated with the skill can vary greatly from team member to team member (i.e., from individual to individual). Such variability can depend on factors such as the team member's experience, frequency of using the skill, quantity of time using the skill, leadership or mentorship responsibilities and activities with respect to the skill, and others.

The collective knowledge of a workforce or team of a workforce with respect to a skill is dynamic, as individuals leave the workforce (e.g., for retirement or to take another job), and join the workforce.

In a non-limiting example that will be referred to in this disclosure, a financial institution relies on a set (or suite) of computing applications (SCA) that run all personal banking (e.g., deposits, withdrawals, payments, transfers, personal bank account maintenance, customer profiles, etc.) products and services of the institution. A team of individuals (the "SCA team") of the workforce is responsible for the SCA. Such responsibilities can involve SCA-specific skills, e.g., SCA oversight, SCA cybersecurity monitoring, SCA troubleshooting for customers, SCA functional updates (e.g., updating a customer-facing graphical interface), SCA cybersecurity updates, SCA bug resolution for underlying source code, and so forth. Skill knowledge of a given team member can be determined with respect to a specific application of the SCA or with respect to multiple applications of the SCA, or with respect to the entire suite of applications of the SCA.

Continuing with the SCA example, each member of the SCA team has a member-specific knowledge with respect to the SCA skills. Each member's knowledge can also be denoted on a skill by skill basis from the set of SCA skills. Each team member's knowledge with respect to the SCA skills can depend on, e.g., the team member's experience on the job, frequency of using the skill, quantity of time using the skill, leadership or mentorship responsibilities and/or activities with respect to the skill, and other factors, such as lines of software source code written or edited by each team member for the SCA. Thus, the SCA team can have a non-uniform knowledge distribution among the team members for the SCA skills.

In addition to a non-uniform knowledge distribution, the SCA team can experience departures of team members and arrivals of new team members. Team members can depart for retirement or move to another job, or for another reason. New team members can arrive to replenish departing workforce talent and/or to increase workforce size. Thus, the SCA team's knowledge distribution is dynamic, changing over time.

Due to the non-uniform knowledge distribution and/or the dynamic nature of the knowledge distribution, there is an ever present risk that the SCA team could, at some point in time, lack sufficient skills knowledge to run the SCA, which would place the financial institution in a disadvantageous position.

It can be challenging for the financial institution to identify that risk, quantify that risk, and determine how urgently the risk should be addressed or mitigated.

Similarly, it can be challenging for the financial institution to ensure that sufficient SCA team knowledge is always present to run and manage the SCA. For example, it can be difficult to evaluate the impact of a known or potential future departure of a team member on the knowledge of the team and, therefore, how to replenish the knowledge represented by that team member for optimal ongoing performance of the team and the SCA.

For instance, it can be difficult to determine whether the knowledge is best replenished with a new hire or hires, by upskilling another member of the team or multiple members of the team, a combination thereof, and/or other strategies.

In addition, if upskilling is appropriate, it can be difficult to determine an optimal form for the upskilling, such as person to person mentoring or shadowing, attendance at a live training course, viewing of a pre-recorded or streaming training video, etc.

Likewise, it can be difficult for the financial institution to determine when and to what extent a departing or potentially departing team member should be involved in the upskilling, whether as a mentor, as an instructor of a course, as a content contributor to a training video, as a combination of one or more of these, and so forth.

Another challenge that the financial institution can face is how to distribute upskilling resources to team members and keep track of upskilling fulfillment by team members.

Another challenge that the financial institution can face is to develop an understanding of real-time knowledge risks for all teams that make-up the workforce so that upskilling resources can be distributed to prioritize the highest risk teams and/or to prioritize the teams whose responsibilities have the highest impact on the performance of the financial institution.

Systems and methods of the present disclosure can address one or more of the foregoing challenges and difficulties.

The present disclosure is directed to a workforce knowledge risk mitigation platform, or risk mitigation platform (RMP). The RMP is a computing-based platform that can automate a number of risk mitigation measures for a workforce of an enterprise. Such measures include identifying knowledge risk, categorizing and/or quantifying the risk, determining a risk mitigation plan based on the category and/or quantity of risk, implementing a risk mitigation plan, and presenting information relating to risks and risk mitigation in a coherent, easily digestible, and easily navigable and interactive formats for stakeholders of the enterprise.

Accordingly, several advantages and practical applications are realized by the systems and methods of the present disclosure. For example, embodiments of the present disclosure identify workforce knowledge risks that otherwise would go undetected and lead to skill deficiencies in the enterprise's workforce.

Further practical applications of embodiments of the present disclosure include the generation of graphical interfaces that present workforce knowledge risk information and knowledge risk mitigation information in a highly structured, optimized, and interactive format that allows workforce knowledge risks to be identified, progress monitored, and mitigation implementation tracked quickly and easily.

Further practical applications of embodiments of the present disclosure include using specialized computer tools, such as skill complexity analyzers and skill activity detectors, to assess workforce knowledge risk and/or recommend or implement a risk mitigation measure.

A skill complexity analyzer is a computer-implemented tool (e.g., sequences of instructions executable by one or more processors) that measures and records a complexity level of a computer application associated with a skill, based on one or more complexity factors. An example complexity factor can be a number of lines of code that run the application. Another example complexity factor can be a number of discrete objects defined by the code. Another example complexity factor can be a number of other applications that interface with the application in order for the application to run. Another complexity factor can a magnitude of processing power by one or more processors to run the application.

A skill activity detector is a computer-implemented tool (e.g., sequences of instructions executable by one or more processors) that detects a user's activity level with respect to a skill. For example, for a given member of a team of a workforce, a skill activity detector tracks and records when the team member is both logged in and using an application associated with the skill.

In some examples, the skill activity detector is further configured to determine a type of activity associated with the skill that is performed by the team member. For example, the skill activity detector is configured to detect and record when, how often, and for how long, the team member is accessing source code or scripts that run the application associated with the skill. As another example, the skill activity detector is configured to detect and record how often (e.g., a frequency) a team member modifies source code or scripts that run the application associated with the skill. As another example, the skill activity detector is configured to detect and record how often, and for how long, the team member is navigating user interfaces generated by the application. As another example, the skill activity detector can detect and record which features of a user interface of the application are being used by the team member, with different user interface features being associated with different skills.

Further practical application of embodiments of the present disclosure include the automated distribution of digital upskilling content to one or more members of the workforce based on workforce knowledge risk assessment and/or risk mitigation assessment.

Further practical applications of embodiments of the present disclosure include restructuring how enterprises track employees, anticipate human resources, shortfalls, and mitigate such shortfalls or prevent them from occurring. For example, embodiments of the present disclosure can result in a workforce expansion (e.g., new hires) when no workforce expansion would otherwise have occurred. In another example, embodiments of the present disclosure can result in upskilling of workforce members when no such upskilling would otherwise have occurred.

Through automated identification and addressing of workforce knowledge risk, further practical applications of embodiments of the present disclosure can be realized.

FIG. 1 schematically shows components of an example system 10 according to the present disclosure. The system 10 includes a server 12 and a user device 14.

The user device 14 is a computing device, such as a laptop computer, a desktop computer, a tablet computer, a smartphone, etc.

The server 12 is a computing device configured to generate and provide the functionality for a workforce risk mitigation platform (RMP) using an RMP driver 22, a skill activity detector 24, and a skill complexity analyzer 26, stored on a memory 18. The server 12 can be associated with a given financial services institution or other business enterprise. The server 12 can be configured to be accessed only by the institution or business enterprise to which it is associated. Alternatively, the server 12 can correspond to shared computing resources, such as a computing cloud, to which a given institution or other business enterprise can gain access for their private computing needs.

The server 12 includes one or more processor(s) 20 configured to process data and execute computer readable instructions stored on the memory 18 for performing functions of the server 12 described herein.

As mentioned, the memory 18 stores the RMP driver 22, the skill activity detector 24 and the skill complexity analyzer 26.

The user device 14 includes one or more processor(s) 28 and an input/output (I/O) device 30. The I/O device 30 includes a graphical display 32, such as a touch screen, that is configured to provide interactive graphical user interfaces such as the graphical user interfaces shown in FIGS. 4-7.

The processor(s) 28 can execute computer readable instructions for performing functions of the user device 14, such as displaying features of graphical user interfaces, and processing inputs entered by users using those interfaces.

The I/O device 30 can also be configured to receive a query relating to workforce risk management of an enterprise. For example, a stakeholder may request a report on knowledge risk or knowledge risk mitigation for a particular team, for a particular individual, or across the entire enterprise. Such a request may be provided using the I/O device 30 using, e.g., the graphical display 32, or another component of the I/O device 30, such as an audio device platform (e.g., a microphone).

The server 12 and the user device 14 are interconnected via a network 34. The network 34 can be any suitable data network, such as the internet, a wide area network, a local area network, a wired network, a wireless network, a cellular network, a satellite network, a near field communication network, or any operatively connected combination of these. Inputs to the user device 14 can be received by the server 12 via the network 34 and vice versa.

The system 10 can include one or more databases 38. The database(s) can be internal to the enterprise or external with remote permission access. For example, the database(s) can be provided with shared computing resources, such as a cloud.

The database(s) 38 store(s) data and parameters used by the RMP driver 22. For example, the database(s) 38 store(s) upskilling media content 39, recorded risk factor data 40, predefined thresholds 42, and predefined categories 44. Such information can be generated and modified by the enterprise as needed.

The upskilling media content 39 can include pre-recorded audio files and/or video files containing content for upskilling individuals of the workforce in various skills. For example, training sessions can be recorded in audio/and or video format and stored in the database 38.

Recorded risk factor data 40 includes data used by the RMP driver 22 to determine whether there is a risk associated with a workforce skill. For example, risk factor data 40 can include self-assessments by individuals as to their knowledge level with respect to a skill. In another example, risk factor data 40 can include a number of members of a team that are associated with a skill.

In another example, risk factor data 40 can include a modification history of a tool (e.g., an application) associated with the skill. Such a modification history can include a frequency with which modifications are made over time and/or a measurement of a magnitude of such modifications. For example, a modification that adds a user facing function can be deemed a greater magnitude modification than a modification that does not add a user facing function.

In another example, risk factor data 40 can include data related to skill complexity. Skill complexity data can include, for example, a number of lines of source code associated with a skill, a number of discrete objects defined by the source code, and/or a number of other applications that interface with the application in order for the application to run. The skill complexity data can be generated by the skill complexity analyzer 26 and stored in the database(s) 38.

In another example, risk factor data 40 can include data generated by the skill activity detector 24. Such data can include, for example, a frequency and duration for which a team member is accessing source code or scripts that run an application associated with the skill, a frequency with which a team member modifies source code or scripts that run the application associated with the skill, a frequency and duration that a team member is navigating user interfaces generated by the application, an identification of which features of a user interface of the application are used by the team member, and others.

In another example, risk factor data can include data related to departure risks for workforce individuals, such as individuals' retirement eligibilities, employment terms (e.g., whether they have employment contracts and the terms of such contracts), and so forth.

The predefined thresholds 42 can be defined and modified by the enterprise. The thresholds 42 can dictate the risk factor data that trigger indication of a knowledge risk associated with the skill. For example, the thresholds 42 can include a team knowledge distribution threshold that triggers indication of a knowledge risk when more than a predefined percentage (e.g., 50 percent) of knowledge associated with a skill is concentrated in a single member of the team or less than a minimum percentage of team members (e.g., less than 25 percent of the team members).

In another example, the thresholds 42 can include a threshold that dictates a modification frequency of a tool associated with a skill that elevates a risk level associated with that skill.

In another example, the thresholds 42 can include a threshold that dictates an activity frequency or activity duration of an individual with respect to a skill (e.g., the individual's level of engagement with tools associated with the skill) that elevates that individual's knowledge associated with the skill.

In another example, the thresholds 42 can include a threshold that dictates a minimum number of team members' knowledge levels with respect to a skill that must be known in order to consider certain risk factor data, such as knowledge level distribution for the team with respect to the skill.

The predefined categories 44 can be defined and modified by the enterprise. The categories can include categories of knowledge risk to which skills are assigned. Knowledge risk can be categorized, for example, as known knowledge risk or unknown knowledge risk. A risk can be unknown if there is insufficient (e.g., below a predetermined threshold) knowledge level data available with respect to team. Knowledge risk can also be categorized based on skill complexity, with knowledge risks associated with high complexity skills being categorized differently from knowledge risks associated with low complexity skills. Knowledge risk can be categorized based on imminency. For example, a knowledge risk associated with a team that has only one subject matter expert (SME) with respect to a skill, and that SME is approaching retirement eligibility, is categorized differently from a knowledge risk associated with a team that has multiple subject matter experts, or a greater percentage of subject matter experts, and also categorized differently from a knowledge risk associated with a team that does not have a subject matter expert approaching retirement.

The categories assigned to skills' knowledge risk can determine the mitigation measures. For example, based on the category of risk assigned, it can be determined how many individuals need to be upskilled, to what extent, and within what timeframe.

A different knowledge risk level can correspond to each category. The knowledge risk levels can correspond to a combination of the factors that determine the mitigation measure to recommend and implement.

The risk determining module 46 of the RMP driver 22 is configured to pool data associated with an individual or a team, and a skill, and determine based on that data, if there is knowledge risk to the enterprise. The data can be obtained using the skill activity detector 24, the skill complexity analyzer 26, the recorded risk factor data 40, the predefined thresholds 42, and other data, such as personal skill knowledge information entered manually by workforce members via the I/O device 30.

The risk categorizing module 48 is configured to categorize a risk associated with a workforce skill, using the predefined thresholds, and the same data as pooled by the risk determining module 46.

The knowledge distribution module 49 is configured to calculate a knowledge distribution across a team of the workforce with respect to a workforce skill using the same data pooled by the risk determining module 46.

The mitigation planning module 50 is configured to generate a risk mitigation plan for a skill based on a risk category or associated risk level assigned to the skill by the risk categorization module 48

The mitigation implementation module 52 is configured to implement the plan generated by the module 50. For example, the mitigation implementation module 52 can automatically update a calendar of a team member to include an invitation to a training course or mentorship session. In another example, the mitigation implementation module 52 can automatically generate a link to a pre-recorded training session (e.g., from the upskilling media content 39) or to a streaming training session that can be accessed by a team member for upskilling purposes.

In some examples, the system 10 includes a media playback device 60. The media playback device can be an independent device, or part of the user device 14, or part of the server 12. The media playback device 60 is configured to play media content, such as video files, audio files, video streaming feeds and audio feeds, and so forth, including the upskilling media content 39. The media playback device 60 can include a speaker for generating audio and a display screen for generating video. In some examples, a workforce individual logs into the risk mitigation platform using the media playback device 60 and plays upskilling media content that has been automatically assigned and distributed by the mitigation implementation module 50.

The RMP reporting module 54 is configured to process outputs provided by other components of the RMP driver 22 such that they can be displayed in formatted and organized graphical user interfaces provided at the graphical display 32.

Figure 2:
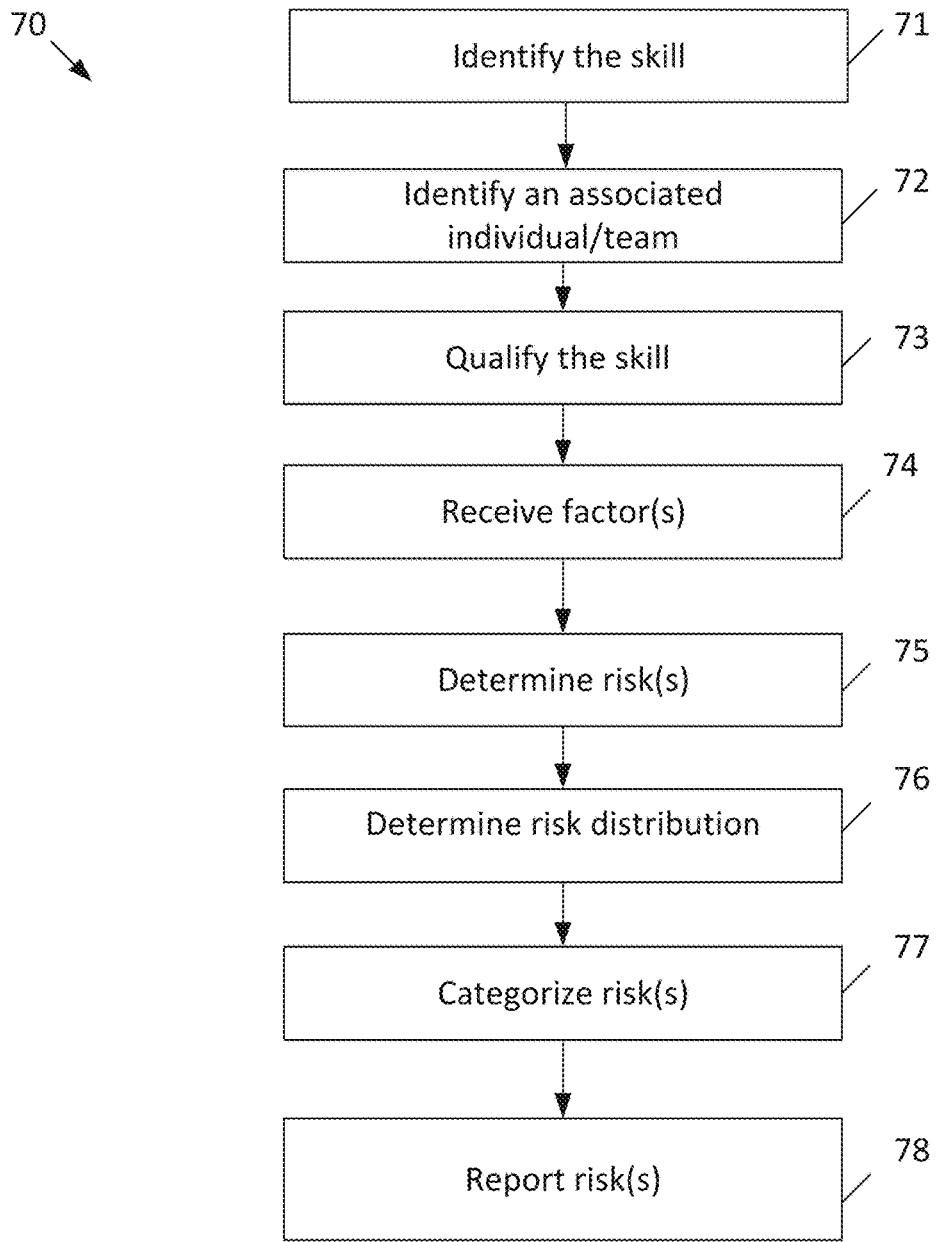
FIG. 2 is an example process flow that can be performed using the system of FIG. 1.

FIG. 2 is an example process flow 70 that can be performed using the system of FIG. 1.

At a step 71 of the process 70 a skill is identified. For example, a stakeholder of the enterprise can input a particular skill using the user device 14 (FIG. 1) for analysis and knowledge risk reporting. The skill can be, e.g., a particular banking application of the SCA suite.

At a step 72, a workforce individual or team associated with the skill is identified. In some examples, the team is identified automatically by the RMP driver 22 (FIG. 1) based on the identified skill. In some examples, a stakeholder of the enterprise can input a particular individual or team using the user device 14. In some examples, the steps 71 and 72 can be reversed. For example, an associated skill can be automatically identified by the RMP driver 22 (FIG. 1) based on an identified individual or team.

At a step 73, the identified skill is qualified by the RMP driver 22 (FIG. 1) and/or the skill complexity analyzer 26 (FIG. 1).

In some examples, qualifying the skill can include assigning an importance of the skill to the enterprise. For example, a skill that is critical to running a majority of the enterprise's project can be assigned a higher importance than a skill that is needed for a single product of the enterprise only.

In some examples, qualifying the skill can include, for example, determining a complexity level of the skill. The RMP driver 22 can use the skill complexity analyzer 26 (FIG. 1) to determine a complexity of the skill. In some examples, complexity level is determined using the predefined thresholds 42 and/or the predefined categories 44 (FIG. 1). For example, the predefined categories 44 can include complexity categories (e.g., high complexity, medium complexity, low complexity) and the predefined thresholds 42 can include complexity thresholds. A skill complexity can be assigned a complexity category based on the magnitude of one or more complexity factors associated with the skill relative to the corresponding predefined complexity thresholds.

At a step 74, the RMP driver 22 (FIG. 1) receives knowledge risk factors associated with the skill. The knowledge risk factors can be obtained from the risk factor data 40 (FIG. 1). The knowledge risk factors can also be obtained from user inputs (e.g., self-assigned knowledge levels entered via the user device 14 by workforce individuals associated with the skill). The risk factors can also be obtained using the skill activity detector 24 (FIG. 1).

At a step 75 the RMP driver 22, using the risk factors obtained at step 74, determines a knowledge risk associated with the skill. That a knowledge risk exists or does not exist can be determined using the predefined thresholds 42 (FIG. 1) and comparing one or more of the factors to one or more predefined thresholds.

In one example scenario, a knowledge risk is determined to exist by the RMP driver 22 with respect to the identified skill at the step 75 if a knowledge level of greater than a predefined threshold percentage (e.g., 74 percent) of the identified team members associated with the skill is known, and at least one of the following is true: 1) none of the known knowledge levels of the identified team members are at the highest predefined level (e.g., subject matter expert); or 2) less than a predefined threshold percentage (e.g., 22 percent) of the known knowledge levels of the team are at the highest predefined level, or next to highest level.

In some examples, the predefined threshold percentage of the identified members associated with the skill can depend on the size of the team. For example, for a team of one or two members, this threshold can be 100 percent, whereas for a team of at least 100 members, this threshold can be less than 100 percent (e.g., 74 percent).

At the step 76, the RMP driver 22 (FIG. 1) determines a knowledge risk distribution for the team with respect to the identified skill. The step 76 can include a statistical analysis of the known knowledge levels of team members with respect to the skill. The determined knowledge risk distribution can indicate higher or lower concentrations of knowledge in individual team members. For example, the knowledge risk distribution can indicate that one team member of a ten member team has 70 percent of the team's knowledge with respect to the skill and another team member has 25 percent of the team's knowledge with respect to that skill, such that 80 percent of the team members have only 5 percent of the knowledge with respect to the skill.

In some examples, the step 76 includes flagging any team members, based on the predefined thresholds 42, whose knowledge with respect to the skill exceeds a predefined threshold percentage (e.g., 10 percent) of the collective team knowledge.

At a step 77, a risk identified at step 75 is categorized using the predefined thresholds 42, the predefined categories 44, the risk distribution and/or any flags (or number of flags) from step 76, and/or other factors such as modification frequency of a tool associated with the skill and a likelihood of departure from the team or from the workforce of one of the team members. The modification frequency can be determined using the skill activity detector 24 (FIG. 1), for example.

In a pair of example scenarios, with all other factors being equivalent, at the step 77 the risk category assigned to the skill by the RMP driver 22 (FIG. 1) when a supporting tool has a relatively low frequency of modification is different (e.g., less urgent) than when the supporting tool has a relatively high frequency of modification.

In a further pair of example scenarios, with all other factors being equivalent, at the step 77 the risk category assigned to the skill by the RMP driver 22 (FIG. 1) when a team member has a relatively high percentage of the team's knowledge and a relatively high likelihood of departure, a supporting tool associated with the skill that has a relatively low frequency of modification is different (e.g., lower risk) than when the supporting tool has a relatively high frequency of modification (e.g., higher risk). Lower likelihood of departure can reduce the risk level, as can lower concentration percentage of the team's knowledge with the individual.

At a step 78, the RMP driver 22 (FIG. 1) can cause the user device 14 to display one or more reports indicating the skill, the individual and/or team, the skill qualities, the knowledge risks, the risk distribution, and the categories or corresponding levels of the risks determined at steps 71, 72, 73, 75, 76, and 77.

Figure 3:
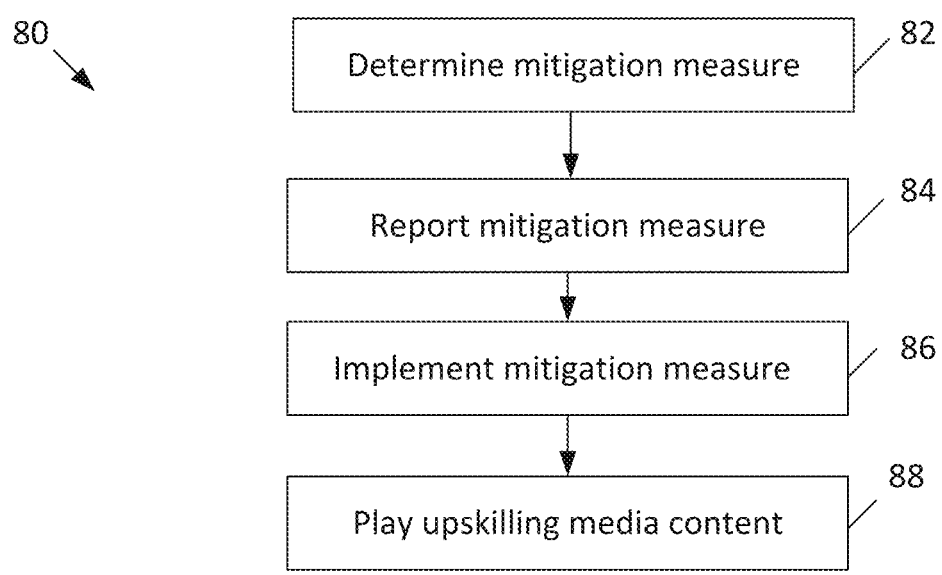
FIG. 3 is a further example process flow that can be performed using the system of FIG. 1.

FIG. 3 is a further example process flow 80 that can be performed using the system of FIG. 1.

In some examples, the process 80 is subsequent to the process 70. For example, the process 80 can use outputs from one or more steps of the process 70 as inputs.

At a step 82, the RMP driver 22 (FIG. 1) determines an appropriate mitigation measure to mitigate a knowledge risk of a skill based on one or more factors. The factors can include, for example, the risk category or risk level determined at step 77 (FIG. 2), one or more qualities of the skill determined at step 73 (FIG. 2), the risk distribution determined at step 76 (FIG. 2), and/or other factors. For example, if a team associated with a skill is in jeopardy of losing its only subject matter expert for the skill, then at step 82, the RMP driver 22 may determine a risk mitigation plan that includes mentoring or shadowing for a period of time between the subject matter expert and at least the next most knowledgeable member of the team with respect to that skill. In a lower knowledge risk scenario, at step 82 the RMP driver 22 may determine a risk mitigation plan that includes viewing of a pre-recorded upskilling video relating to the skill by one or more members of the team.

At a step 84, the RMP driver 22 (FIG. 1) can cause the user device 14 to display one or more reports indicating one or more recommended risk mitigation measures or a recommended risk mitigation plan determined at the step 84. In some examples, the step 85 can include reporting upskilling programs and their progress with respect to an individual, a team, a skill, and/or across an enterprise in an easily navigable format (e.g., by applying filters to the displayed information), such that trouble areas (e.g., skills lagging in their mitigation plan progress) can be identified and prioritized for intervention.

At a step 86, the mitigation measure or plan determined at the step 84 can be implemented. In some examples, the step 86 includes generating a link to an item of the upskilling media content 39 relevant to the identified skill, for playing the upskilling media content item on the media playback device 60 (FIG. 1). In some examples, a message (e.g., an electronic message) can be automatically generated and sent by the RMP driver 22 (FIG. 1) to a subject matter expert (SME) to mentor one or more other team members regarding the skill. In another example, a link to an upskilling media content item (pre-recorded or streaming) relevant to the skill is automatically generated and sent by the RMP driver 22 to a team member determined to need upskilling with respect to the skill.

At a step 88, if the mitigation measure or mitigation plan includes digesting an upskilling media content item, the upskilling media content item can be played using the playback device 60 by, e.g., clicking on the auto-generated link.

Figure 4:
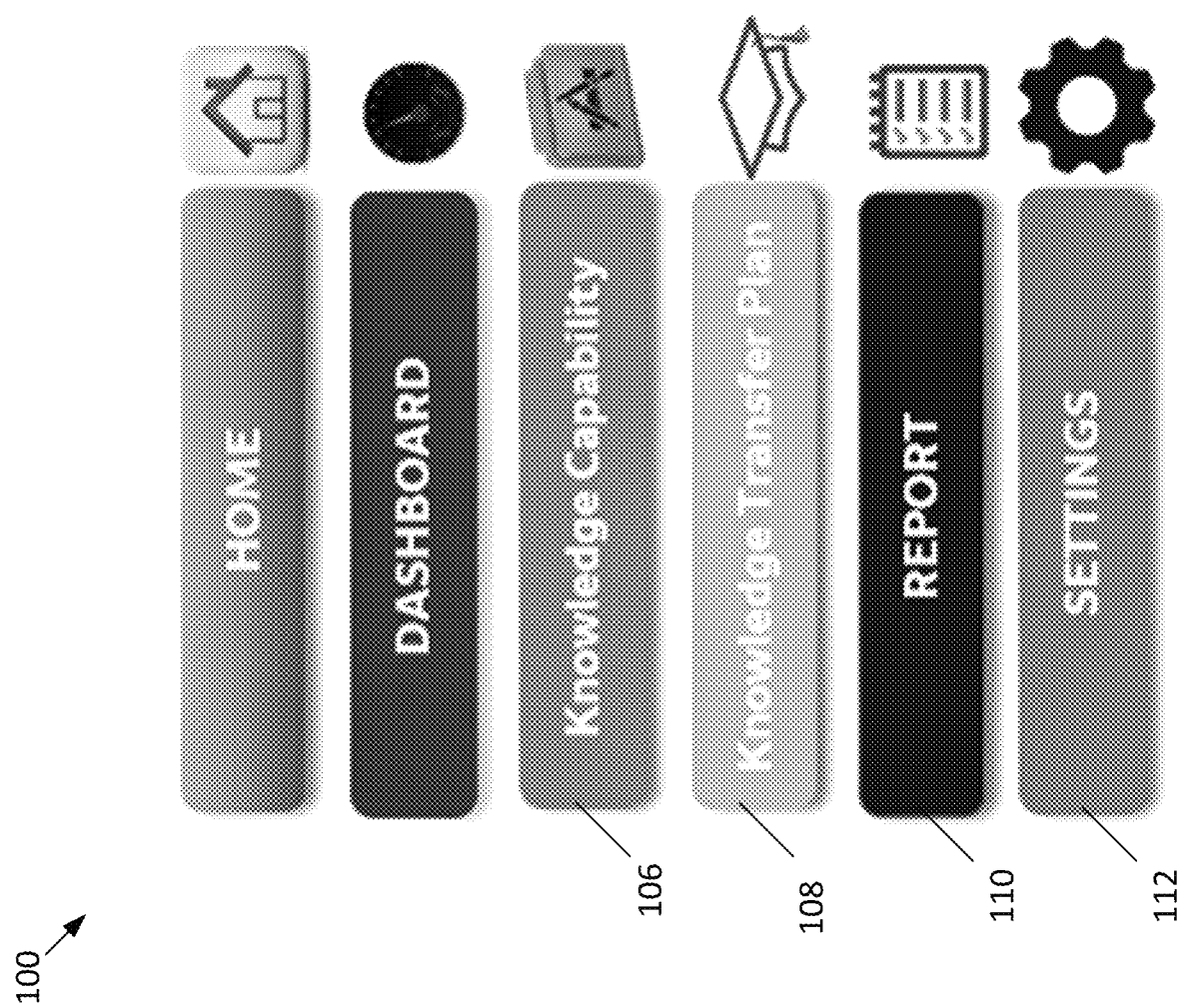
FIG. 4 is a portion of an example graphical user interface generated by the system of FIG. 1.

FIG. 4 is a portion of an example graphical user interface 100 generated by the system of FIG. 1. The interface 100 can be generated by the RMP driver 22 (FIG. 1) and displayed using the graphical display 32 of the user device 14 (FIG. 1). The interface 100 includes various graphical elements.

The interface 100 includes selectable navigation buttons for accessing, viewing, and modifying different aspects of the risk mitigation platform (RMP).

The button 106 is selectable to view skill knowledge levels across an enterprise (e.g., FIG. 8).

The button 108 is selectable to view and modify risk mitigation plans and measured that can be recommended and implemented using the RMP driver 22 (FIG. 1).

The button 110 is selectable to view data relating to the RMP in a structured manner, using, e.g., data filters, and customizable graphical representations.

The button 112 is selectable to modify personal settings related to using the RMP.

Figure 5:
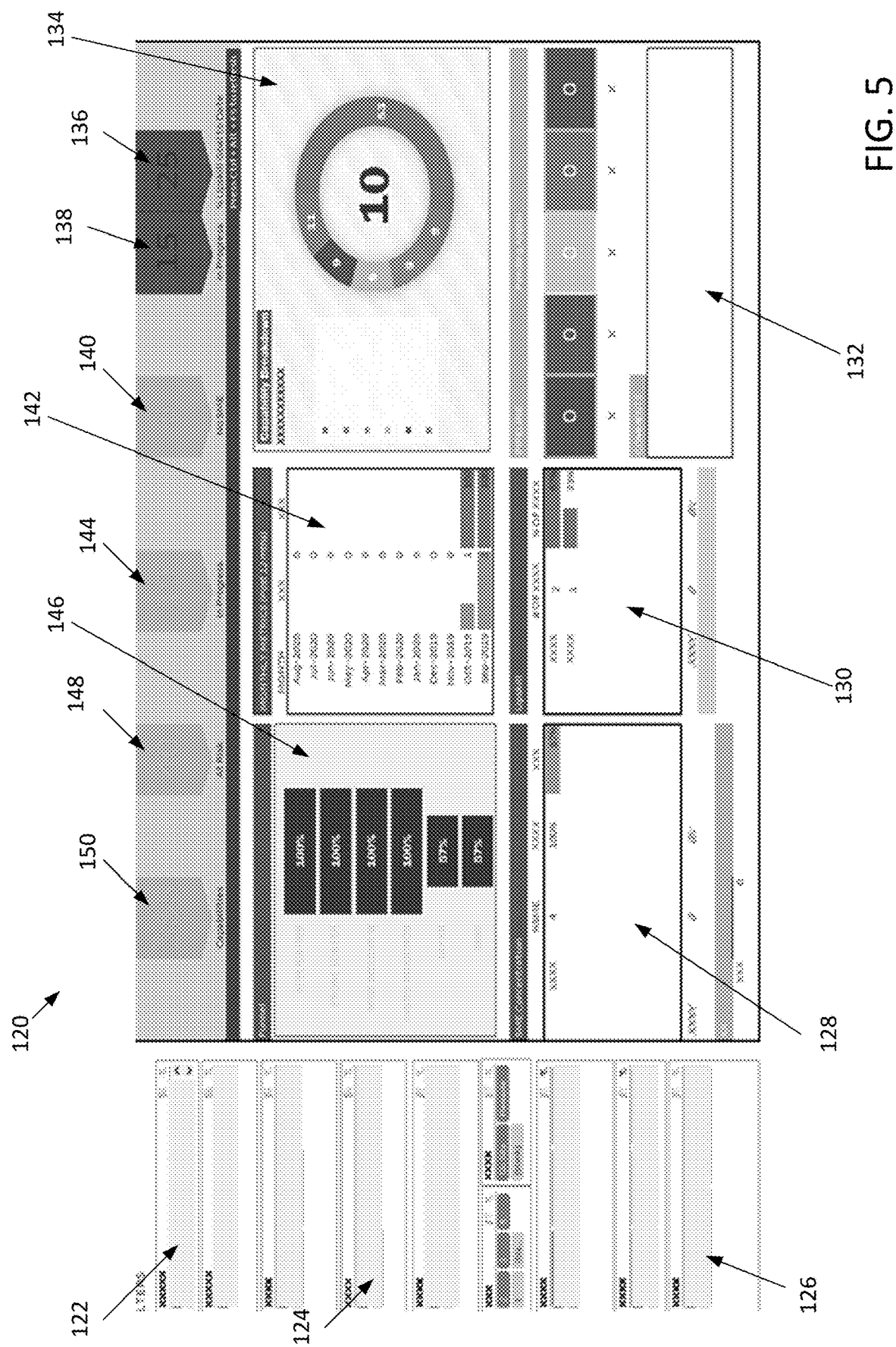
FIG. 5 is a portion of a further example graphical user interface generated by the system of FIG. 1.

FIG. 5 is a portion of a further example graphical user interface 120 generated by the system of FIG. 1. The interface 120 can be generated by the RMP driver 22 (FIG. 1) and displayed using the graphical display 32 of the user device 14 (FIG. 1). The interface 120 can be generated by selection of the button 110 of FIG. 4. The interface 120 includes various graphical elements.

The interface 120 includes filters 122, 124, 126 configured to filter what information is displayed on the interface 120 and/or the format with which it is displayed. Example filter options include filtering by skill, filtering by team, filtering by individual, filtering by risk level (e.g., reporting high risk skills only), filtering by skill complexity (e.g., reporting high complexity skills only), filtering by departure likelihood (e.g., reporting only skills with high likelihood of imminent departure by a subject matter expert), filtering by team size, filtering by product, filtering by supporting application or software tool, and so forth.

The interface 120 includes various report windows that can be adjusted based on the filters.

The report window 128 includes indicia that indicate areas of SME concentrations where it is appropriate to implement mentoring based on the selected filters.

The report window 130 includes indicia that capture and quantify upskilling efforts and progress based on the selected filters.

The report window 132 includes indicia that indicate progress of a team or individual with respect to an upskilling program, based on the selected filters.

The report window 134 includes indicia that show a breakdown of different skills associated with a given product, underlying application and/or team, based on the selected filters.

The report window 142 includes indicia indicating periodic (e.g., month over month) historical tracking of knowledge risks and/or knowledge risk mitigation, with respect to an individual, a team, a skill, a product, an application, based on the selected filters.

The report window 146 includes indicia indicating a hierarchical view of the percentages of all skills associated with a team, a product, or an application for which sufficient knowledge risk data has been collected, based on the selected filters.

The interface 120 also includes summary quantifications that can be helpful for a stakeholder to quickly glean a big picture assessment of workforce knowledge risk. The summary quantifications include a quantification 136, based on the selected filters, including indicia indicating a percentage of an upskilling goal that has been completed.

The quantification 138 includes indicia indicating, based on the selected filters, a number of upskilling programs that are in progress.

The quantification 140 includes indicia indicating, based on the selected filters, a number of skills, products that lack a subject matter expert.

The quantification 144 includes indica indicating, based on the selected filters, a number of skills, products, applications, or so forth, for which an upskilling plan has been assigned.

The quantification 148 includes indica indicating, based on the selected filters, a number of skills, products, applications, or so forth that are considered to be modified with relatively high frequency and for which a knowledge risk has been identified.

The quantification 150 includes indicia indicating a number of skills captured by the other quantifications and the report windows of the interface 120.

Figure 6:
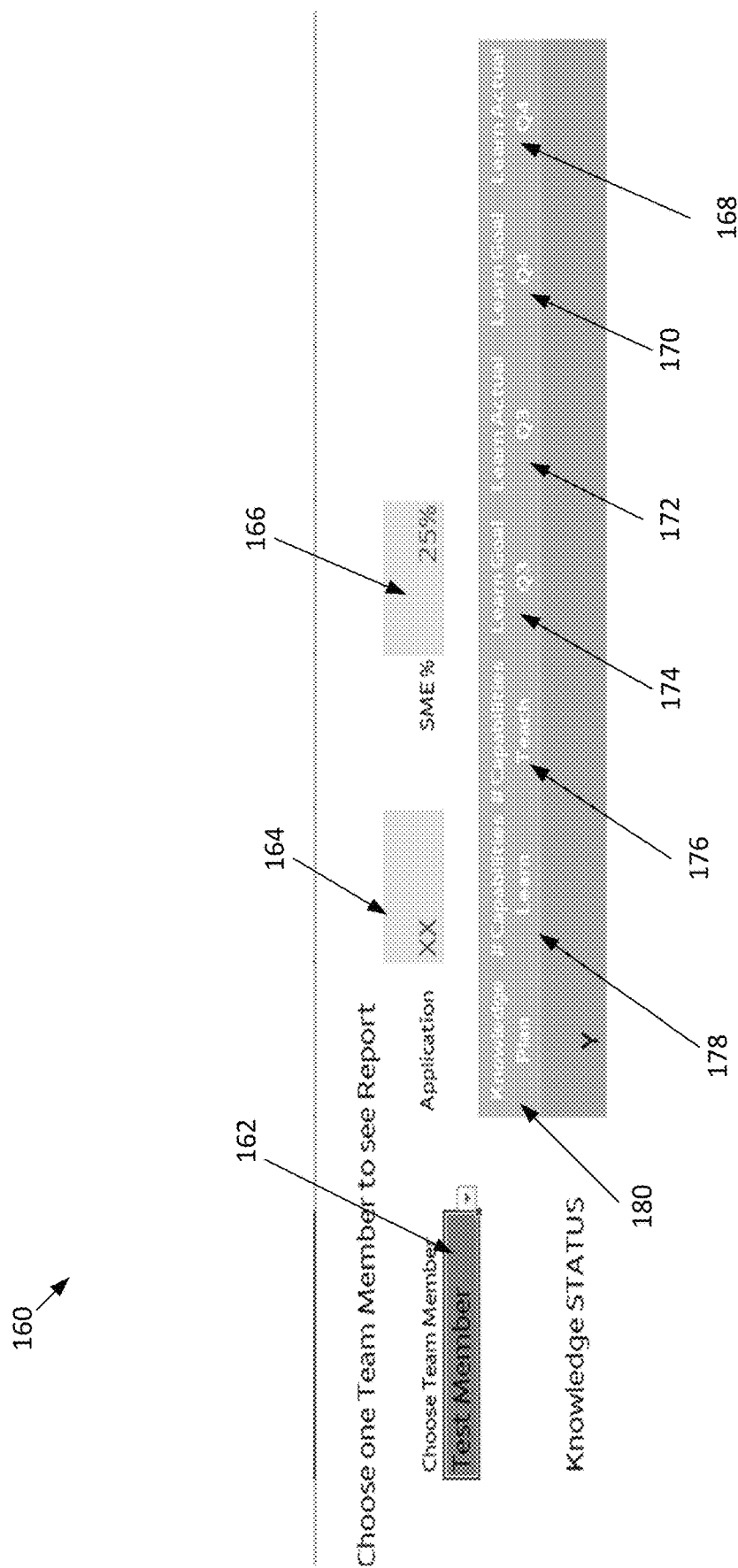
FIG. 6 is a portion of a further example graphical user interface generated by the system of FIG. 1.

FIG. 6 is a portion of a further example graphical user interface 160 generated by the system of FIG. 1. The interface 160 can be generated by the RMP driver 22 (FIG. 1) and displayed using the graphical display 32 of the user device 14 (FIG. 1). The interface 160 can be generated by selection of the button 108 of FIG. 4. The interface 160 includes various graphical elements.

The interface 160 includes an entry field 162 (e.g., including a dropdown menu) for selecting a team member for which a knowledge risk mitigation plan progress is sought to be viewed.

The field 164 includes indicia that can indicate an application, skill, or product for which the team member requires upskilling.

The field 166 includes indicia that can indicate, e.g., in percentage form, the selected team member's knowledge level relative to a subject matter expert with respect to the application, skill, or product identified in the field 164.

The fields 168, 170, 172, 174, 176, 178 and 180 include indicia collectively indicating whether a knowledge risk mitigation plan has been assigned to the identified team member with respect to the identified skill, application or product, as well as a status and progress of the team members with respect to the risk mitigation plan. For example, these fields can track whether teaching and/or learning goals for the team members with respect to the skill are achieved at various milestones (e.g., quarters).

Figure 7:
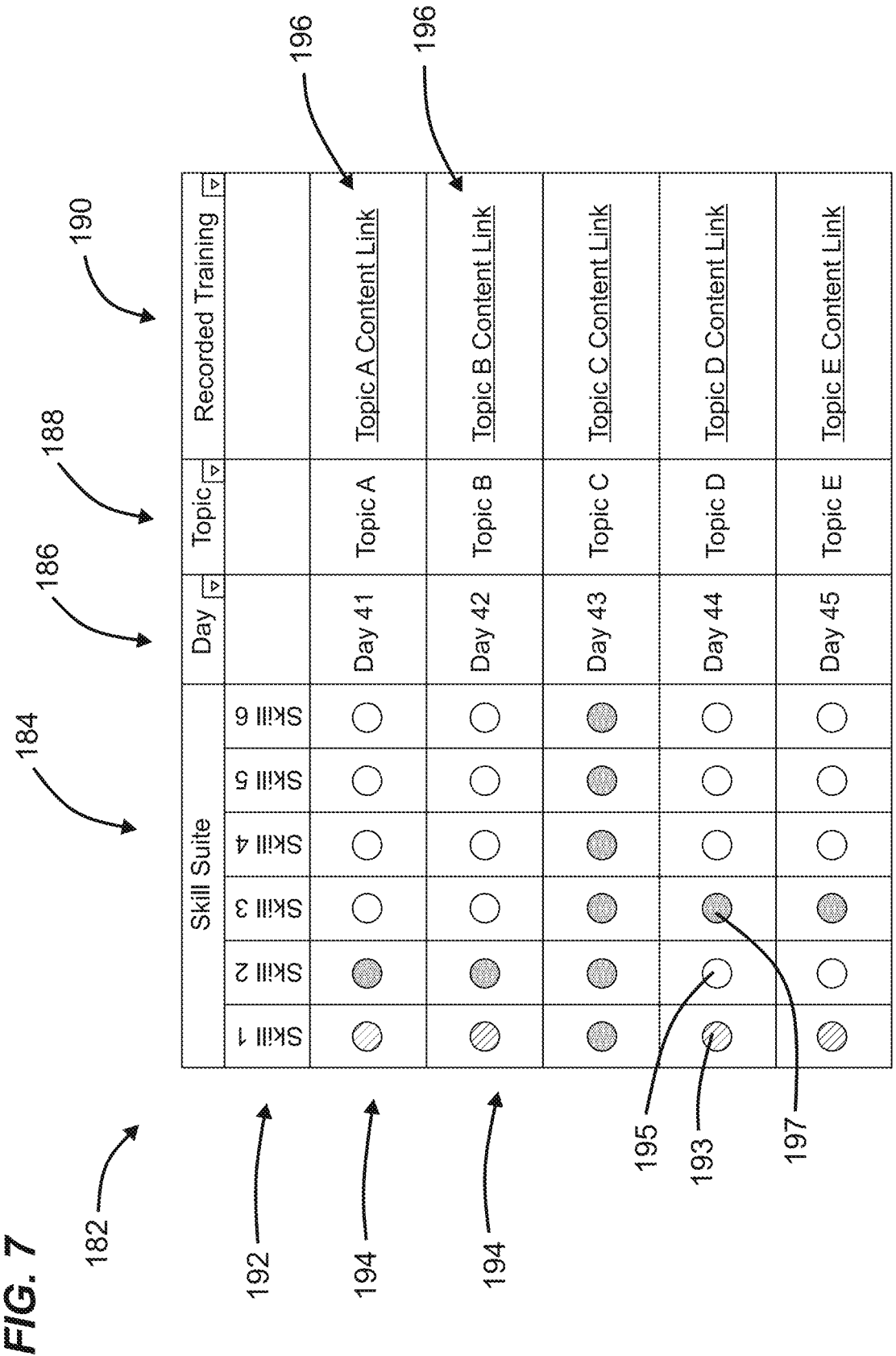
FIG. 7 is a portion of a further example graphical user interface generated by the system of FIG. 1.

FIG. 7 is a portion of a further example graphical user interface 182 generated by the system of FIG. 1. The interface 182 can be generated by the RMP driver 22 (FIG. 1) and displayed using the graphical display 32 of the user device 14 (FIG. 1). The interface 182 includes various graphical elements.

The interface 182 includes a chart or table with various information and interactive elements. The chart is dedicated to a skill suite 194 made up of various skills 192. Color coded indicia 193, 195, 197 indicate, for each skill, whether a particular upskilling topic 188 is required, recommended or optional. The color coded indicia are presented in rows 194, each corresponding to a different topic 188 and a different day or time 186 on which the topic is being offered as part of a risk mitigation plan determined by the RMP driver 22 (FIG. 1).

The column 190 includes links 196 to media content items associated with certain ones of the topics 188. The links are automatically generated by the RMP driver 22. Selection of a link, e.g., by a team member viewing the user interface 182 using the user device 14 can cause the media playback device 60 to play the corresponding upskilling media content item as part of implementing the risk mitigation program.

FIG. 8 is a portion of a further example graphical user interface 300 generated by the system of FIG. 1. The interface 300 can be generated by the RMP driver 22 (FIG. 1) and displayed using the graphical display 32 of the user device 14 (FIG. 1). The interface 300 includes various graphical elements. The interface 300 includes an interactive chart or table with various columns and rows that indicates knowledge risk with respect to skills associated with a team of the workforce. In some examples, the interface 300 can be generated by selection of the button 106 in FIG. 4.

The table 301 of the interface 300 includes a column 302 listing skills.

The table 301 includes a column 304 indicating a corresponding application (e.g., software application) for each of the skills.

The table 301 includes a column 306 indicating a corresponding workforce team for each of the skills.

The table 301 includes a column 308 indicating a frequency of modification (or change) associated with each skill (e.g., a frequency with which a software tool associated with the skill is modified or added).

The table 301 includes a column 310 indicating a complexity level corresponding to each of the skills.

The table 301 includes a column 312 indicating whether each corresponding skill is a critical skill for the enterprise.

The table 301 includes columns 314, 316, 318, 320 and 322 each representing a team member of the team identified in column 306. Each column 314, 316, 318, 320, 322 indicates (e.g., numerically), for the corresponding team member and a corresponding one of the skills, a knowledge level of that team member. In some examples, the knowledge level can be user defined and/or modified using the interface 300.

The table 301 includes a column 324 indicating, e.g., with color coded indicia, whether skill knowledge data from a sufficient percentage of team members is known to perform a full knowledge risk assessment on the team.

The table 301 includes a column 326 indicating, e.g., with color coded indicia, whether each of the skills has a corresponding knowledge risk due to there being less than a threshold percentage of the team that are highly skilled with respect to the skill and the skill or related tool being modified frequently.

The table 301 includes a column 328 indicating, e.g., with color coded indicia, whether each of the skills has a corresponding knowledge risk due to there being a lack of skill knowledge generally for the team, despite the fact that the skill or a related tool is rarely modified.

The table 301 includes a column 330 indicating, e.g., with color coded indicia, whether each of the skills has a corresponding knowledge risk due to there being an insufficient number of subject matter experts associated with the skill and/or because knowledge with respect to a skill is too concentrated in a relatively small number of team members.

Figure 9:
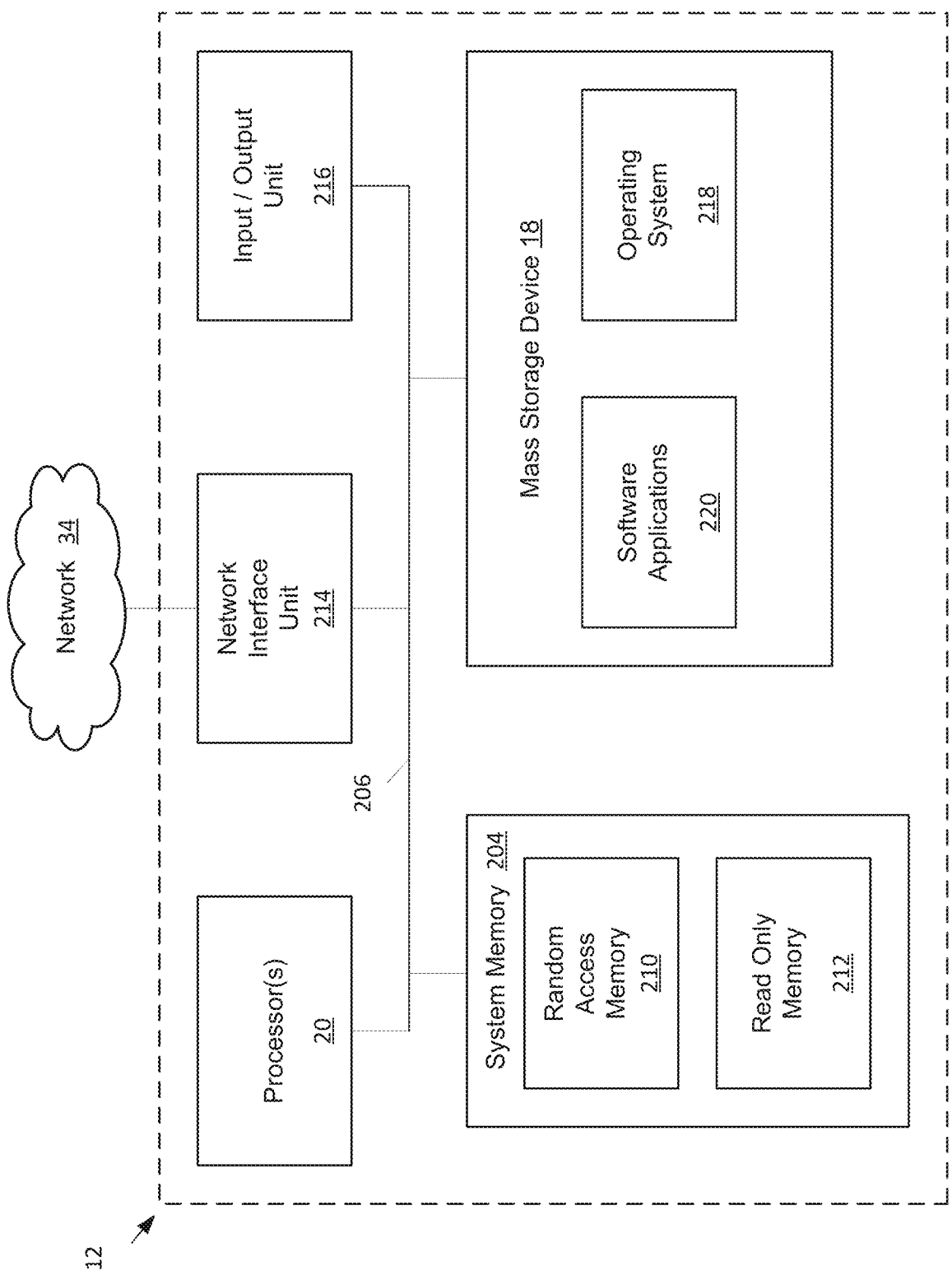
FIG. 9 schematically shows example computing components of the system of FIG. 1.

Additional components of the server 12 are illustrated in FIG. 9. In this example, the server 12 provides the computing resources to perform the functionality associated with the system 10 (FIG. 1). The server 12 can be an internally controlled and managed device (or multiple devices) of the financial institution or other business enterprise.

Alternatively, the server 12 can represent one or more devices operating in a shared computing system external to the institution or other business enterprise, such as a cloud.

Further, the other computing devices disclosed herein can include the same or similar components, including the user device 14.

Via the network 34, the components of the server 12 that are physically remote from one another can interact with one another.

The server 12 includes at least processor(s) 20, a system memory 204, and a system bus 206 that couples the system memory 204 to the processor(s) 20. In some examples, the processors 20 can also include the processor(s) 28 (FIG. 1).

The system memory 204 includes a random access memory ("RAM") 210 and a read-only memory ("ROM") 212. A basic input/output system that contains the basic routines that help to transfer information between elements within the server 12, such as during startup, is stored in the ROM 212.

The server 12 further includes a mass storage device 18. The mass storage device can correspond to the memory 18 of the system 10 (FIG. 1). The mass storage device 18 is able to store software instructions and data, such as the RMP driver 22, the skill activity detector 24, and the skill complexity analyzer 26 (FIG. 1).

The mass storage device 18 is connected to the processor(s) 20 through a mass storage controller (not shown) connected to the system bus 206. The mass storage device 18 and its associated computer-readable data storage media provide non-volatile, non-transitory storage for the server 12. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server 12.

According to various embodiments of the invention, the server 12 may operate in a networked environment using logical connections to remote network devices through the network 34, such as a wireless network, the Internet, or another type of network. The server 12 may connect to the network 34 through a network interface unit 214 connected to the system bus 206. It should be appreciated that the network interface unit 214 may also be utilized to connect to other types of networks and remote computing systems. The server 12 also includes an input/output unit 216 for receiving and processing input from a number of other devices, including a touch user interface display screen, an audio input device, or another type of input device. Similarly, the input/output unit 216 may provide output to a touch user interface display screen or other type of output device, including, for example, the I/O device 30 (FIG. 1).

As mentioned briefly above, the mass storage device 18 and/or the RAM 210 of the server 12 can store software instructions and data. The software instructions include an operating system 218 suitable for controlling the operation of the server 12. The mass storage device 18 and/or the RAM 210 also store software instructions and applications 220, that when executed by the processor(s) 20, cause the server 12 to provide the functionality described above.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer-implemented method, comprising:
generating a user interface using a computing application;
determining, using a skill activity detector, a workforce skill activity type of a plurality of workforce skill activity types associated with the computing application to provide a determined workforce skill activity type, wherein providing the determined workforce skill activity type includes detecting, with the skill activity detector, that a feature of a plurality of features of the user interface generated by the computing application is being used, the feature being associated with the determined workforce skill activity type, and another feature of the plurality of features being associated with another workforce skill activity type of the plurality of workforce skill activity types;
determining, using a skill complexity analyzer, a complexity of a workforce skill corresponding to the determined workforce skill activity type, including:
measuring and recording, using the skill complexity analyzer, a magnitude of processing power used by one or more computer processors to run the computing application, the computing application being associated with the workforce skill; and
determining and recording, using the skill complexity analyzer, a frequency with which source code or a script that runs the computing application associated with the workforce skill is modified, the workforce skill requiring use of computer software;
determining, based on at least three factors, a knowledge risk associated with the workforce skill, the at least three factors including the determined workforce skill activity type, the magnitude of the processing power, and the frequency;
categorizing, based on the at least three factors, the knowledge risk in a risk category selected from a set of predefined knowledge risk categories;
assigning a risk level to the knowledge risk based on the risk category;
automatically selecting and implementing, based on the risk category and the determined workforce skill activity type, an upskilling recommendation for reducing the knowledge risk, including:
automatically updating a calendar to include an invitation to a training session associated with the upskilling recommendation;
automatically identifying, based on the upskilling recommendation, a digitally stored training media content item; and
automatically generating a link to the digitally stored training media content item;
generating, using one or more graphical user interfaces:
visual risk indicia that visually indicate the knowledge risk, the risk category, and the risk level; and
a graphical element, the graphical element including the link and being selectable to play the digitally stored training media content item;

receiving a selection of the graphical element; and
in response to receiving the selection, playing, with a media playback device, the digitally stored training media content item.

2. The method of claim 1, wherein the at least three factors further include a knowledge level associated with the workforce skill and the knowledge level corresponding to an individual of a workforce.

3. The method of claim 1, wherein the at least three factors further include a knowledge level distribution associated with the workforce skill among individuals of a workforce.

4. The method of claim 1, wherein the at least three factors further include a quantified portion of knowledge of a workforce associated with the workforce skill attributed to an individual of the workforce.

\* \* \* \* \*